US010970665B2

(12) United States Patent
Fang (10) Patent No.: US 10,970,665 B2
(45) Date of Patent: Apr. 6, 2021

(54) LOGISTICS INFORMATION ACQUISITION METHOD AND SYSTEM FOR TRANSNATIONAL TRANSPORT

(71) Applicant: DEMON NETWORK TECH. CO., LTD., Guangdong (CN)

(72) Inventor: Zehui Fang, Guangdong (CN)

(73) Assignee: DEMON NETWORK TECH. CO., LTD., Shenzhen (CN)

( * ) Notice: Subject to any disclaimer, the term of this patent is extended or adjusted under 35 U.S.C. 154(b) by 152 days.

(21) Appl. No.: 16/086,314

(22) PCT Filed: Mar. 30, 2016

(86) PCT No.: PCT/CN2016/077877
§ 371 (c)(1),
(2) Date: Sep. 18, 2018

(87) PCT Pub. No.: WO2017/166127
PCT Pub. Date: Oct. 5, 2017

(65) Prior Publication Data
US 2019/0102733 A1 Apr. 4, 2019

(51) Int. Cl.
*G06Q 30/00* (2012.01)
*G06Q 10/08* (2012.01)
*G06Q 50/28* (2012.01)

(52) U.S. Cl.
CPC ..... *G06Q 10/0833* (2013.01); *G06Q 10/0831* (2013.01); *G06Q 50/28* (2013.01)

(58) Field of Classification Search
CPC . G06Q 10/0833; G06Q 10/0831; G06Q 50/28
USPC .................................. 705/16, 333
See application file for complete search history.

(56) References Cited

U.S. PATENT DOCUMENTS

| 2006/0241822 A1* | 10/2006 | Yadappanavar | G06Q 10/06312 701/5 |
| 2009/0089145 A1* | 4/2009 | Kent | G06Q 50/28 705/7.12 |
| 2015/0161564 A1* | 6/2015 | Sweeney | G06Q 10/063114 705/338 |

FOREIGN PATENT DOCUMENTS

CN 103136653 A 6/2013

OTHER PUBLICATIONS

International Search Report of PCT Patent Application No. PCT/CN2016/077877 dated Dec. 16, 2016.

* cited by examiner

*Primary Examiner* — Rokib Masud (57) ABSTRACT

The present disclosure discloses a logistics information acquisition method and system for transnational transport. The method and system of the present invention provide a user with a one-stop full-logistics query service, unify full-logistics information of transnational transport into one query portal for query, thus a user simply needs to query once to acquire transnational transport information from shipped to final delivery between a transporter in country of origin, one or more of transporters in transit countries, and a transporter in final destination country. With the method in the present disclosure, it eliminates the need for the user to query logistics information of transnational transport on each respective of websites of the transporters in all countries, thereby greatly reducing logistics query time, and improving logistics query efficiency, and having significant meanings for the related practitioners in cross-border eCommerce industry.

14 Claims, 2 Drawing Sheets

LOGISTICS INFORMATION ACQUISITION METHOD AND SYSTEM FOR TRANSNATIONAL TRANSPORT

TECHNICAL FIELD

The present disclosure relates to technology for querying logistics information, and particularly to a method and system for acquiring logistics information of transnational transport.

BACKGROUND

The domestic parcel distribution market is mature, but in order to meet the requirements of the cross-border eCommerce business and the demand of the global society, the emerging multinational markets continue to grow. The national postal company is a postal system that operates primarily in a specific country, such as the United States Postal Service Corporation or the Italian Postal Group. At present, most of the national postal companies around the world do not provide global visualization for end-to-end distribution services. As a result, companies and individuals must rely heavily on other transporters to distribute parcels internationally. A similar situation exists in the commercial logistics industry, since receiving points/delivering points in transnational transport is widely distributed, and it is impossible for an independent commercial logistics company to complete the whole process of the transnational transport, even for DHL, the world's leading mail and logistics company, a part of transnational transport is performed by a cooperative relay station.

For example, although the national postal company is allowed to be used for international distributions on for example e-commerce sites, the international logistics tracking and payment capabilities of the services provided by the national postal company are limited and uncoordinated. This is because most postal companies offer domestic postal and commercial logistics options rather than the complete "postal service options" from one country to another country. As a result, the buyers are forced to rely on private shipping companies, which normally provide international shipping with expensive shipping rate. In addition, buyers also may find it difficult to pay in the seller's currency.

The global postal companies are only responsible for the domestic part of transport while the foreign part of transport will be taken on by each respective country's postal company. Therefore, the parcel information mostly includes a process of the domestic transport rather than a process of the foreign postal company, and similarly, some commercial logistics also only include a process of the domestic transport.

It is such a great challenge for the postal companies who are participating in cross-border logistics to provide the tracking information query of the parcels they carry. Today, postal companies only have limited capabilities for tracking parcels between countries, as each domestic postal company may use various of different query methods and/or codes.

A very important feature of the transnational transport is the difference in logistics environments of different countries, especially the difference of logistics soft environment. Under the laws applicable to different logistics in different countries, the complexity of transnational transport is much higher than that of the domestic logistics in one country, and the transnational transport may be even blocked. In different countries, different economic and technology development levels, the transnational transport is supported by different technology conditions, and even some technologies simply cannot be applied to some regions, which reduces a whole level of the transnational transport system. Due to the fact that different countries have different standards, it is difficult to realize transnational logistics integration, which makes it difficult to establish a transnational transport system. The transnational transport is also limited due to customs and culture of different countries. In addition, different transporters differ in query methods, like different languages, as well as different description methods of information and different ways of presentation, which makes the query process cumbersome, difficult and not easy to understand or the like.

Information described in the background part is only intended to provide an understanding for an overall background of the present disclosure, rather than being regarded as admitting or implying that the information is the conventional technology known by those skilled in the art in any manner.

SUMMARY

An objective of the present disclosure is to provide a method and system for acquiring logistics information of transnational transport, to solve the problems in the conventional technology of cumbersome steps and complex operations for querying logistics information of transnational transport.

In order to realize the above objective, a method for acquiring logistics information of transnational transport is provided, which includes:

step A, receiving a tracking number inputted by a user, and recognizing information and an identifier of a starting transporter in the tracking number based on a preset tracking number rule base;

step B, acquiring logistics information of the starting transporter based on the tracking number, the information and the identifier of the starting transporter;

step C, extracting a logistics information query parameter of a transporter in a first transit country, information and an identifier of the transporter in the first transit country from the logistics information of the starting transporter;

step D, acquiring logistics information of the transporter in the first transit country based on the logistics information query parameter of the transporter in the first transit country, the information and the identifier of the transporter in the first transit country;

step E, extracting a logistics information query parameter of a transporter in a second transit country, information and an identifier of the transporter in the second transit country from the logistics information of the transporter in the first transit country;

step F, acquiring logistics information of the transporter in the second transit country based on the logistics information query parameter of the transporter in the second transit country, the information and the identifier of the transporter in the second transit country;

step G, repeating step E and step F until no logistics information query parameter of a next country is contained in logistics information of a transporter in a transit country, and taking logistics information of the transporter in the transit country as logistics information of a final transporter; and step H, combining and outputting the logistics information of the starting transporter, the logistics information of the transporters in all the transit countries and the logistics information of the final transporter and the identifiers of all the transporters.

Preferably, in the above technical solution, the tracking number inputted by the user is a global unique tracking number generated by the starting transporter based on a preset tracking number rule, or the tracking number inputted by the user is a global unique tracking number generated by a system for acquiring logistics information of transnational transport based on a preset tracking number rule and returned to the starting transporter.

Preferably, in the above technical solution, the acquiring the logistics information of the transporter in the step B, the step D and/or the step F includes:

searching a preset rule base for an information acquisition manner corresponding to the transporter based on the information of the transporter, where the information acquisition manner includes: a simulative request on a website of the transporter, a request at a public query interface of the transporter and/or a request at a cooperative query interface of the transporter;

acquiring data related to the logistics information query parameter based on the information acquisition manner through network access; and extracting all information related to logistics information from the data upon acquiring the data, where the logistics information includes a logistics event, an event time, an event location, various significant identifiers and/or information of a next transit country.

Preferably, in the above technical solution, the extracting the logistics information query parameter of the transporter in the transit country, the information and the identifier of the transporter in the transit country in the step C and/or the step E includes:

extracting a parameter used for querying logistics information of a transporter in a next transit country based on the logistics information of a previous one transporter and/or previous more transporters, where the parameter at least includes an international standard country code converted from a country identifier.

Preferably, in the above technical solution, tracking number rules of a plurality of transporters are preset in the tracking number rule base;

in a case that it is recognized based on the tracking number rule base that the tracking number conforms to tracking number rules of a plurality of transporters, information of a starting transporter specified by the user in the plurality of transporters is acquired, and in a case that the tracking number is unrecognized based on the tracking number rule base, a prompt that the tracking number is unrecognized is returned, and information of other transporter specified by the user is acquired.

Preferably, in the above technical solution, the logistics information query parameter includes one or more of a logistics tracking number, a website of a transporter, a logistics information tracking link and a postal code.

Preferably, in the above technical solution, the step H further includes:

classifying the combined and outputted logistics information into different types, different languages, different formats or different description of logistics information, to obtain states of different stages in a logistics process; and unifying the classified states into a preset data format, and outputting and displaying the preset data format of states.

A system for acquiring logistics information of transnational transport is further provided, which includes:

a tracking number recognizing module configured to receive a tracking number inputted by a user, and recognize information and an identifier of a starting transporter in the tracking number based on a preset tracking number rule base;

a starting information acquiring module configured to acquire logistics information of the starting transporter based on the tracking number, the information and the identifier of the starting transporter;

a first information extracting module configured to extract a logistics information query parameter of a transporter in a first transit country, information and an identifier of the transporter in the first transit country from the logistics information of the starting transporter;

a first logistics acquiring module configured to acquire logistics information of the transporter in the first transit country based on the logistics information query parameter of the transporter in the first transit country, the information and the identifier of the transporter in the first transit country;

a second information extracting module configured to extract a logistics information query parameter of a transporter in a second transit country, information and an identifier of the transporter in the second transit country from the logistics information of the transporter in the first transit country;

a second logistics acquiring module configured to acquire logistics information of the transporter in the second transit country based on the logistics information query parameter of the transporter in the second transit country, the information and the identifier of the transporter in the second transit country;

a final information acquiring module configured to repeat the operations of the second information extracting module and the second logistics acquiring module until no logistics information query parameter of a next country is contained in logistics information of a transporter in a transit country, and take logistics information of the transporter in the transit country as logistics information of a final transporter; and an information combining and outputting module configured to combine and output the logistics information of the starting transporter, the logistics information of the transporters in all the transit countries and the logistics information of the final transporter and the identifiers of all the transporters.

Preferably, in the above technical solution, the tracking number inputted by the user is a global unique tracking number generated by the starting transporter based on a preset tracking number rule, or the tracking number inputted by the user is a global unique tracking number generated by the system for acquiring logistics information of transnational transport based on a preset tracking number rule and returned to the starting transporter.

Preferably, in the above technical solution, the starting information acquiring module, the first logistics acquiring module and/or the second logistics acquiring module is configured to acquire the logistics information of the transporter by the following steps:

searching a preset rule base for an information acquisition manner corresponding to the transporter based on the information of the transporter, where the information acquisition manner includes: a simulative request on a website of the transporter, a request at a public query interface of the transporter and/or a request at a cooperative query interface of the transporter;

acquiring data related to the logistics information query parameter based on the information acquisition manner through network access; and extracting all information related to logistics information from the data upon acquiring the data, where the logistics information includes a logistics event, an event time, an event location, various significant identifiers and/or information of a next transit country.

Preferably, in the above technical solution, the first information extracting module and/or the second information extracting module is configured to extract the logistics information query parameter of the transporter in the transit country, the information and the identifier of the transporter in the transit country by the following steps:

extracting a parameter used for querying logistics information of a transporter in a next transit country based on the logistics information of a previous one transporter and/or previous more transporters, where the parameter at least includes an international standard country code converted from a country identifier.

Preferably, in the above technical solution, tracking number rules of a plurality of transporters are preset in the tracking number rule base;

in a case that it is recognized based on the tracking number rule base that the tracking number conforms to tracking number rules of a plurality of transporters, information of a starting transporter specified by the user in the plurality of transporters is acquired, and in a case that the tracking number is unrecognized based on the tracking number rule base, a prompt that the tracking number is unrecognized is returned, and information of other transporter specified by the user is acquired.

Preferably, in the above technical solution, the logistics information query parameter includes one or more of a logistics tracking number, a website of the transporter, a logistics information tracking link and a postal code.

Preferably, in the above technical solution, the information combining and outputting module is further configured to:

classify the combined and outputted logistics information into different types, different languages, different formats or different description of logistics information, to obtain states of different stages in a logistics process; and unify the classified states into a preset data format, and output and display the preset data format of states.

As compared with the conventional technology, the present disclosure has the following advantageous effects. The method and the system for acquiring logistics information of transnational transport in the present disclosure provides a one-stop full-logistics query service to the user, and integrates full logistics information of the transnational transport into a query portal for querying, so that the user can acquire full transnational transport information from the starting transporter to the transporter in the transit country to the final transporter through one-time query. With the method in the present disclosure, it eliminates the need for the user to query logistics information of transnational transport on each respective of websites of the transporters in all countries, thereby greatly reducing logistics query time, and improving logistics query efficiency, and having significant meanings for the related practitioners in cross-border eCommerce industry.

BRIEF DESCRIPTION OF THE DRAWINGS

The drawings are used to provide a further understanding of the present disclosure, and constitute a part of this specification. The drawings together with the description illustrate exemplary embodiments of the present disclosure rather than limiting the present disclosure. In the drawings.

DETAILED DESCRIPTION OF THE EMBODIMENTS

The embodiments of the present disclosure are described below in detail with the accompanying drawings, and it should be understood that the protection scope of the present disclosure is not limited by the embodiments.

Unless otherwise stated, the terms "include" or variations such as "comprise" or "having" thereof are understood as including elements or constituent parts described, and no excluding other elements or other constituent parts, throughout the whole specification and the claims.

In order to solve the technical problem in the conventional technology that cumbersome steps and complex operations for querying logistics of the transnational transport, a method and a system for acquiring logistics information of transnational transport are provided in the present disclosure. A query interface is provided in the method and the system in the present disclosure, and the user submits a tracking number through the query interface, and the system queries the tracking number, and returns a query result to the user. A form of the interface is not limited, and a communicating technology used in tcp, http or other technologies may be used. A format of the submitted data and a format of returned data may be not limited, which may be a data format used in a text, a binary technology, html technology, j son technology, xml technology or other technologies.

First Embodiment

Figure 1:
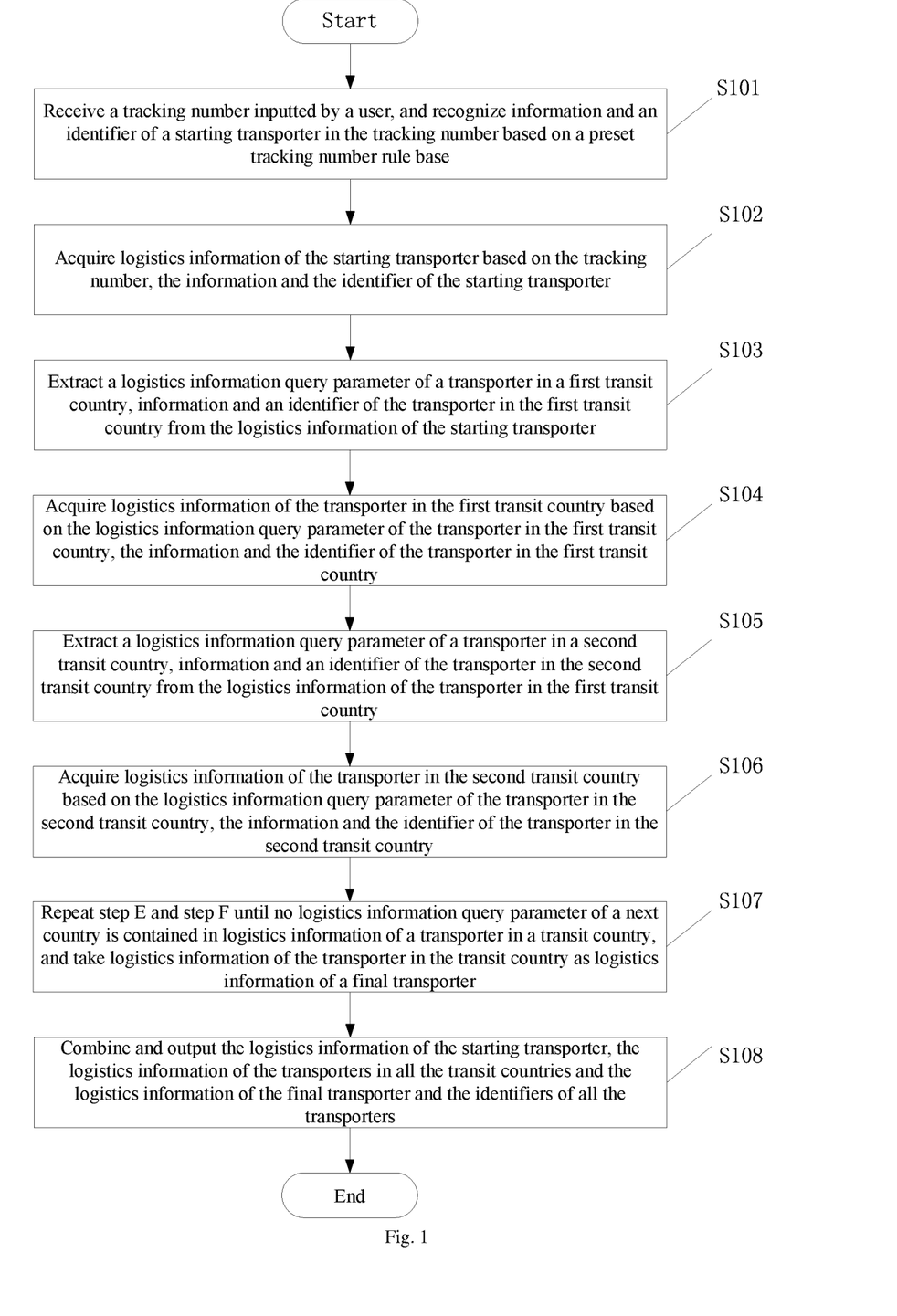
FIG. 1 is a schematic flow diagram of a method for acquiring logistics information of transnational transport in the present disclosure.

As shown in FIG. 1, a method for acquiring logistics information of transnational transport in the present disclosure includes steps 101 to 108.

In step 101, a tracking number inputted by a user is received, and information and an identifier of a starting transporter in the tracking number are recognized based on a preset tracking number rule base.

The user submits one or more tracking numbers to a system for acquiring logistics information of transnational transport in the present disclosure using the GET, the POST or other means in the HTTP, (any communication technology means fall within the protection scope of the present disclosure, in addition to the http) in any technical access manner of a program, a browser and a webpage interface. The plurality of tracking numbers are inputted with specific symbols (for example, line feed, a comma, a semi-colon, a period and the like), to separate the plurality of tracking numbers. The user may also copy and paste text information including a plurality of tracking numbers and other contents, and a tracking number rule base automatically performs rule analysis on the text information pasted by the user, and extracts a tracking number contained in the text information that conform to the rules.

The identifier of the starting transporter is used to identify a field including a name of the starting transporter. The information of the starting transporter includes information of a transporter which receives a parcel/package firstly.

The tracking number rule base is used to store or describe tracking number rules of logistics transporters. The constitution of the tracking number rule is not limited. The tracking number rule includes but is not limited to various tracking numbers. A parameter (text description information for a tracking number) is provided to the rule base, to match with information of the transporter. The tracking number rule base may be extended, added and updated for recognizing and matching more transporters. The tracking number may be defined by a logistics company, or may be determined in a case that the logistics company negotiates with the system for acquiring logistics information of the transnational transport in the present disclosure. For example, the tracking number may be a 9-digit number, a 12-digit number, or combination of letters and digits, and may be changed, added or deleted based on actual transport demands. Based on the above content, when the tracking number is analyzed in the embodiment of the present disclosure, the tracking number may be matched directly in the tracking number rule base, to obtain information of the transport corresponding to the tracking number.

Preferably, tracking number rules of a plurality of transporters are preset in the tracking number rule base. In a case that it is recognized based on the tracking number rule base that the tracking number conforms to the tracking number rules of a plurality of transporters, information of a starting transporter specified by the user in the plurality of transporters is acquired. In a case that the tracking number cannot be recognized based on the tracking number rule base, a prompt that the tracking number is unrecognized is returned, and information of other starting transporters specified by the user is acquired.

Upon receiving the tracking number inputted by the user, the system can recognize a transporter to which the tracking number belongs. Each transporter has its own tracking number rules. Alternatively, all of the transporters use the same tracking number rule, and the transporters are distinguished based on different contents in the tracking numbers. Therefore, the tracking number rules of the transporters are filed, and form a tracking number rule base. For example, a tracking number is 123456789 (9-digit number, which is a tracking number of a certain transporter). In a case that a tracking number of a 9-digit number is inputted by the user, a transporter to which the tracking number belongs can be quickly recognized.

Different transporters may use the same tracking number rule. For example, A and B each may have a tracking number of a 9-digit number. When a tracking number of a 9-digit number inputted by a user is recognized, in a case that it is recognized based on the tracking number rule base that both two transporters A and B conform to the tracking number rule for the tracking number of a 9-digit number, the user may specify one transporter of A and B as a starting transporter. In a case that a tracking number inputted by the user is unrecognized, that is, there is no transporter matching with the tracking number in the tracking number rule base, the user may specify other transporter not containing in the tracking number rule base as a starting transporter.

In a case that different transporters use a uniform tracking number rule, the tracking number inputted by the user is a global unique tracking number generated by the starting transporter based on a preset tracking number rule, or a unique tracking number generated by the system for acquiring logistics information of transnational transport based on a preset tracking number rule and returned to the starting transporter. Whereby, all various transporters in the world can be unified into the system of the present disclosure for querying. When the user queries a tracking number without knowing which transporter is used, the system can accurately recognize the tracking number.

Since there are a large number of logistics transporters in the world, a uniform tracking number rule (a format of the rule is not limited, for realizing global uniqueness. For example, ABCXX123456789YQ is defined, and tracking numbers are defined to have the same length, which includes 17 characters, where ABC denotes a transporter, XX denotes a type number defined by the transporter, 123456789 denotes a serial number, and YQ denotes an identification number of the system) for a global unique tracking number is established, to effectively distinguish tracking numbers of different transporters. In this way, which transporter carries the package can be known based on the tracking number.

A data interface is provided by each transporter. A content of the interface includes but is not limited to: an identifier of a starting transporter, which indicates which transporter carries the parcel, and is defined by the transporter, where the system corresponds the identifier defined by the transporter to a uniform identifier; an original tracking number which is a tracking number of the starting transporter; an identifier of a final transporter (may also be a final country), which indicates a final country to which the parcel is transported, where the identifier may be in any form, and the system may convert the identifier to a uniform country identifier; and tracking information on transferring of the parcel in the agent transporter and the like.

In step S102, logistics information of the starting transporter is acquired based on the tracking number, and the information and the identifier of the starting transporter.

Logistics tracking information is collected on a query website corresponding to the starting transporter based on the tracking number and the acquired information and the acquired identifier of the starting transporter. Each tracking number corresponds to a link of a query website for logistics query. A query result for the tracking number on the query website is collected with simulative request technology based on the tracking number provided by the user and the link of query website. The result is represented as usable and accessible data in the formats of html content, json, xml, text and the like, for facilitating aggregation and processing.

After acquiring the logistics information of the starting transporter, the data on the query result are analyzed and segmented, to intercept usable data. Generally, there are a plurality of entries of tracking data. Content of each entry of tracking data includes a timestamp, a parcel/package state, a parcel/package location and the like. The content may be summarized as two parts of content (other part may also be provided, for example, a position and GPS coordinates). One part of content is related to time, and the other part of content is related to an event. The content related to event is analyzed and integrated based on all content of one piece of tracking data. All content relates to the event are stored as a set in a reverse chronological order (the reverse chronological order described in the present disclosure is only exemplary, and a chronological order or a reverse chronological order may be used as long as the same order is used for all of the events). In a case that the tracking number is unrecognized with a query manner corresponding to logistics of the starting transporter, for example, the tracking number is unsupported to be queried, or a query result is blank, or an error occurs in query, a prompt information is returned to the user, the user may directly specify a transit country, and query logistics information of the transit country.

In step S103, a logistic information query parameter of a transporter in a first transit country, information and an identifier of the transporter in the first transit country are extracted from the logistics information of the starting transporter.

A logistics information query parameter of the first transit country is extracted from the logistics information of the starting transporter acquired in step S102. The logistics information query parameter includes one or more of a logistics tracking number, a website of the transporter, a logistics information tracking link, a postal code and the like. It should be understood by those skilled in the art that the logistics information query parameter may not be limited to the above parameters, a parameter which can be used for querying logistics information of the first transit country falls within the protection scope of the present disclosure.

For example, for a transnational transport line of A→B→C→D, the acquired logistics information of the starting transporter A includes a logistics information query parameter of a first transit country B, and information and an identifier of a transporter in the first transit country B.

In step S104, logistics information of the transporter in the first transit country is acquired based on the logistics information query parameter of the transporter in the first transit country, the information and the identifier of the transporter in the first transit country.

The different transporters may correspond to different query manners. For example, a transporter may have a query interface, and in this case, a query result of the transporter is acquired directly through the query interface. In a case that the transporter does not have a query interface, the system initiates a simulative request to a query function module of a website of the transporter, to obtain a query result.

After the query result is obtained, the query results of any transporters may have different data prototypes. The data prototype may be any data format, which includes but is not limited to XML, JSON, HTML or plain text. The data prototype is segmented based on different data formats corresponding to different transporters, to extract data including logistics information of the parcel/package, which includes but is not limited to an event time, an event location, a time content, an arrival place and the like. The data is unified into the same format, which includes but is not limited to XML, JSON, HTML, plain text and the like.

In step S105, a logistics information query parameter of a transporter in a second transit country, and information and an identifier of the transporter in the second transit country are extracted from the logistics information of the transporter in the first transit country.

Step S105 is performed in a case that the transnational transport process may involve more than one transit countries. For example, in a transnational transport line of A→B→C→D, through step S105, a logistics information query parameter of the country C, information and an identifier of the transporter in the country C are acquired from the logistics information of the country B.

Preferably, step S105 may further include: extracting a first logistics information query parameter from the logistics information of the first transit country and a second logistics information query parameter from the logistics information of the starting transporter; and taking the first logistics information query parameter and the second logistics information query parameter as a logistics information query parameter of the second transit country. In the transnational transport line of A→B→C→D described above, in a case that a complete logistic information query parameter of the country C cannot be acquired based on the logistics information of the country B, for example, when providing an inquiry function, the transporters in some countries require to obtain the specific time of the parcel/package to be queried in order to distinguish the time period during the inquiry. In this case, a delivering time in the logistics information of the starting transporter A and a tracking number of the subsequent country C in the logistics information of country B are required The logistics information of the country C is queried based on the tracking number in the country C in conjunction with the delivering time in the country A described above. In an actual transit process, other parameters in the logistics information may also be used, for example, an identifier of the starting transporter, information of the starting transporter, and a postal code of the country C. In the embodiment, the transit transport process of A→B→C→D is taken as an example, and the logistics information of the country C may be queried based on a part or all of logistics information of the country A and the country B. In an actual transit transport process, for example, in a transport process of A→B→C→D→E→F→G, when querying logistics information of the country F, a complete logistic information query parameter of the country F is acquired based on logistics information of a plurality of countries prior to the country F, such as logistics information of the country A, the country B, the country C and the country D or logistics information of the country A, the country B, the country D and the country E. It should be understood by those skilled in the art that the above cases are equivalent variations of the method according to the embodiment of the present disclosure, and also fall within the protection scope of the present disclosure.

Preferably, step S103 and step S105 of extracting the logistics information query parameter of the transporter in the transit country, the information and the identifier of the transporter in the transit country includes: extracting a parameter for querying logistics information of a transporter in a next transit country based on the logistics information of a previous one transporter and/or previous more transporters. The parameter may be an international standard country code converted from a country identifier or a standard code defined in the present disclosure.

In step S106, logistics information of the transporter in the second transit country is acquired based on the logistics information query parameter of the transporter in the second transit country, and the information and the identifier of the transporter in the second transit country.

A query process in step S106 is the same as that in step S102 and step S104. The query process is based on the acquired logistics information query parameter required for querying logistics information of a next transit country and the acquired information of the transporter in the next transit country, which is not described repeatedly here anymore.

Preferably, the step S102, the step S104 or the step S106 of acquiring the logistics information of the transporter includes:

searching a preset rule base for an information acquisition manner corresponding to the transporter based on the information of the transporter, where the information acquisition manner includes: a simulative request on a website of the transporter, a request at a public query interface of the transporter and/or a request at a cooperative query interface of the transporter; acquiring data related to the logistics information query parameter based on the information acquisition manner through network access; and extracting all information related to logistics information from the data upon acquiring the data, where the logistics information includes a logistics event, an event time, an event location, various significant identifiers and/or information of a next transit country.

In step S107, steps S105 and S106 are repeated until no logistics information query parameter of a next country is contained in logistics information of a transporter in a transit country, and the logistics information of the transporter in the transit country is taken as logistics information of a final transporter.

In a case that the parcel/package is transferred only through one country, for example, in a transport process of A→B→C, after logistics information of the country C is obtained, no logistics information query parameter of a next transit country is contained in logistic information of the country C since the country C is a destination country. Therefore, in a case that no logistics information query parameter of a next transit country is contained in the logistics information of the country C, the logistics information of the country C is taken as logistics information of a final transporter.

In a case that a logistics information query parameter of a next transit country is contained in logistics information of a transit country, the query processes in steps S105 to S107 are repeated until logistics information of a final transporter is acquired.

That is, in a case that a logistics information query parameter is contained in the logistics information of the country C, the country C is regarded as a transit country, and logistics information of a next transit country is continued to be queried based on the logistics information query parameter, until logistics information of the final transporter is acquired.

In step S108, the logistics information of the starting transporter, the logistics information of transporters of all transit countries, the logistics information of the final transporter and the identifiers of all the transporters are combined and outputted.

After the logistics information of the starting transporter, the logistics information of transporters of all transit countries, the logistics information of the final transporter and the identifiers of all the transporters are acquired through the above steps, the logistics information of the starting transporter, the logistics information of transporters of the transit countries, the logistics information of the final transporter are organized and combined sequentially. A query result includes an occurrence time of the logistics information and an entry set of occurrence events. In a case that a query result for logistics information of the final transporter is blank, effective query results of the starting transporter and the transporter in the transit country are used directly.

In a case that the query results for logistics information of all of the transporters which deliver the parcel/package are organized and combined, all flows in a process of transporting the parcel/package are obtained, and are combined and outputted. Logistics information finally presented to the user in the embodiment of the present disclosure not only includes detailed information of different stages in different countries which deliver the parcel/package, but also includes the identifier and the information of each of the transporters.

Preferably, the combined and outputted logistics information is classified into different types, different languages, different formats or different description of logistics information, to obtain states of different stages in a logistics process. The transport state includes but is not limited to in-transit, returned, waiting for picking up, successful delivery. The classified states are unified into a preset data format, and the preset data format of states is outputted and displayed. The classified data may be even integrated as a uniform description manner, or translated into a uniform language. Exclude the same events from each node of different transporters, time of the logistics information of the transporters is unified into a same time zone. A transport map route is drawn based on a node position corresponding to each piece of the logistics information, to analyze a uniform parcel state.

The logistics information finally obtained by the user has a uniform data format or a uniform expression format, thereby greatly reducing time consumed by the user to query logistics information in a stage undertaken by each of a plurality of transporters on a website corresponding to the transporter, and avoiding inconvenience of understanding caused by non-uniform original data of the logistics information.

Since transporters in various of different countries have different logistics query manners, different data formats of the queried information are obtained, and content unrelated to the logistics information may also be contained in the queried information. In the embodiment of the present disclosure, the queried data of all of the transporters are acquired, and the acquired data is extracted (a step of querying and extracting data is an independent logical step for different transporters, since processes of querying logistics information undertaken by the transporter are different for different transporters), to obtain content related to the logistics information.

After content related to the logistics information is acquired, the transport state is obtained by performing keyword matching on the content, or the transport state is obtained directly. In a case that the same parcel/package is displayed to be in different transport states in the starting transporter, the transit country and the final transporter. One transport state is selected from states of the two pieces of logistics information as a final transport state, and the selection is performed based on priority levels. For example, in a case that a transport state of the starting transporter is in-transit, and a transport state of the final transporter is successful delivery, a final transport state of the parcel is determined as successful delivery, since the starting transporter and the final transporter carries the parcel in their own transport route segments respectively. In a case that the parcel/package is entered into another country, since the interworking of logistics information isn't realized. Therefore, logistics information of the starting transporter is not updated, and the transport state of the starting transporter is not necessarily consistent with an actual transport state.

A keyword in each piece of event is matched in a set of the query results described above, to determine a current state of the parcel, which includes: in-transit, waiting for picking up, ready to collect, successful delivery and the like. Also, the query result for each tracking number generally includes a sending time and a receiving time. All events for each tracking number are analyzed, to determine a starting time and a finishing time of the event for each tracking number, and record a completion time for the tracking number. The completion time together with the state of the parcel and the above query result are returned and displayed to the user.

More preferably, an original format (for example, XML, JSON, SOAP and text) of the data may be returned, for facilitating being called by another system and secondary development. T The user may also specify a target language and translate the query result into the user's language (using a third-party translation interface, such as Google, Bing and the like), so that the query result is convenient to be read.

The shipping consumption time of the parcel calculated based on the result of the user query is displayed to the user and is stored in a time statistics database. The shipping consumption time may be displayed by a time statistics module, so that the practitioners can know a maximum shipping time, a minimum shipping time and an average shipping time of a parcel delivered from a country to another country in this month or a last month or in a year, which is convenient for the practitioners to compare the time limits and select a suitable manner to sending a parcel.

A query result for the tracking number on the website is collected based on the query for the logistics information in conjunction with the simulative request technology. The query result is expressed as html content or json, xml, text and data which can be used or expressed. The data is analyzed and segmented to intercept usable data. In general, the queried data is represented as a plurality of entries. Each of the entries includes a timestamp, a parcel state, a parcel location and the like. The content may be summarized as two parts of content. One part of content is related to time, and the other part of content is related to an event. The content related to event is analyzed and integrated based on all content of one piece of tracking data. All content relates to the event are stored as a set in a reverse chronological order, and combined and outputted for display.

The method for acquiring logistics information of transnational transport in the present disclosure provides a one-stop full-logistics query service, and integrates full logistics information of the transnational transport into a query portal for querying, so that the user can acquire full transnational transport information from the starting transporter to the transporter in the transit country to the final transporter through one-time query. With the method in the present disclosure, it eliminates the need for the user to query logistics of transnational transport on each respective of websites of the transporters in all countries, thereby greatly reducing logistics query time, and improving logistics query efficiency, and having significant meanings for the related practitioners in this industry.

Second Embodiment

Figure 2:
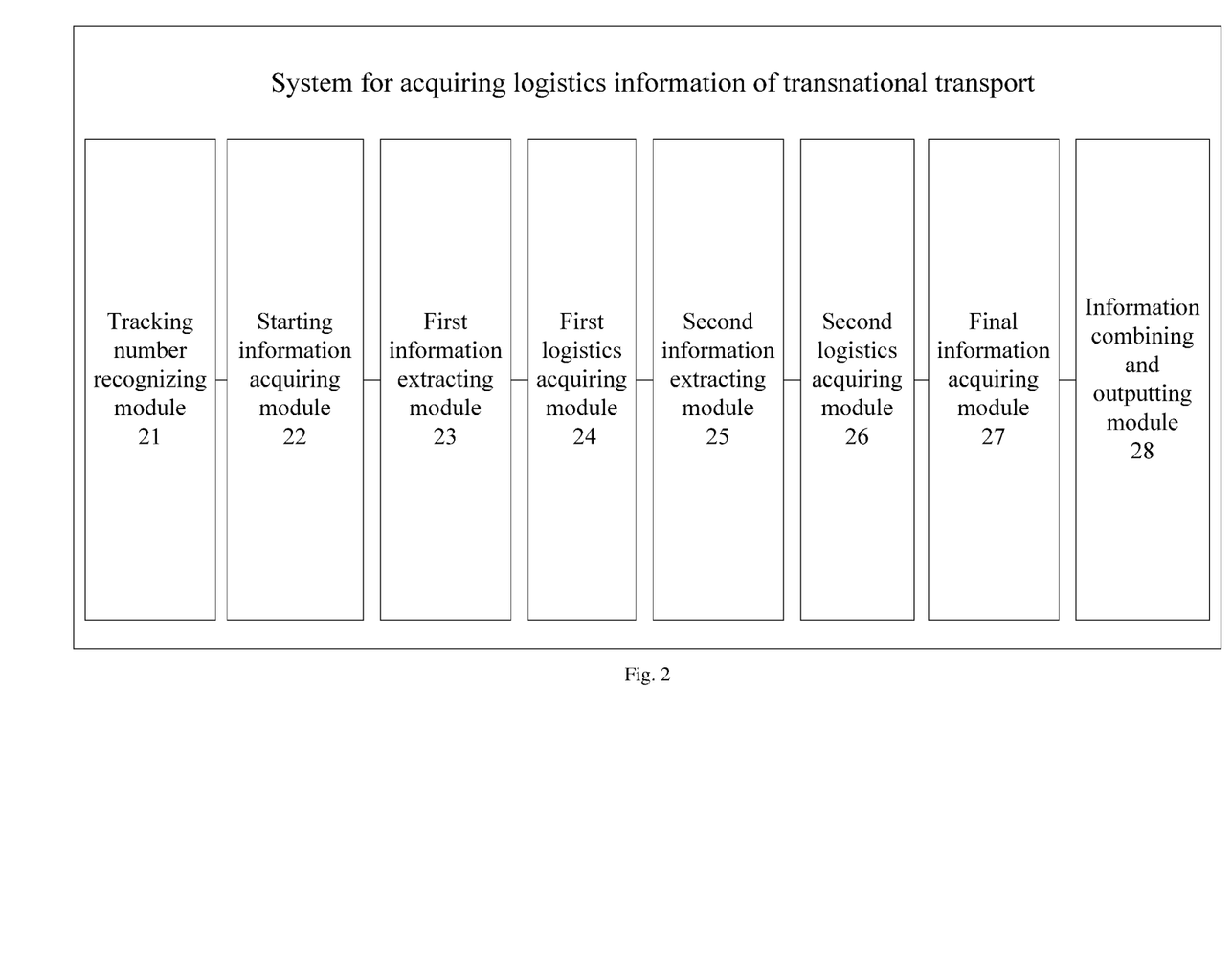
FIG. 2 is a schematic structural diagram of a system for acquiring logistics information of transnational transport in the present disclosure.

As shown in FIG. 2, a system for acquiring logistics information of transnational transport in the present disclosure includes: a tracking number recognizing module 21, a starting information acquiring module 22, a first information extracting module 23, a first logistics acquiring module 24, a second information extracting module 25, a second logistics acquiring module 26, a final information acquiring module 27, an information combining and outputting module 28.

The tracking number recognizing module 21 is configured to receive a tracking number inputted by a user, and recognize information and an identifier of a starting transporter in the tracking number based on a preset tracking number rule base.

The starting information acquiring module 22 is configured to acquire logistics information of the starting transporter based on the tracking number, the information and the identifier of the starting transporter.

The first information extracting module 23 is configured to extract a logistics information query parameter of a transporter in a first transit country, information and an identifier of the transporter in the first transit country from the logistics information of the starting transporter.

The first logistics acquiring module 24 is configured to acquire logistics information of the transporter in the first transit country based on the logistics information query parameter of the transporter in the first transit country, the information and the identifier of the transporter in the first transit country.

The second information extracting module 25 is configured to extract a logistics information query parameter of a transporter in a second transit country, information and an identifier of the transporter in the second transit country from the logistics information of the transporter in the first transit country.

The second logistics acquiring module 26 is configured to acquire logistics information of the transporter in the second transit country based on the logistics information query parameter of the transporter in the second transit country, the information and the identifier of the transporter in the second transit country.

The final information acquiring module 27 is configured to repeat the operations of the second information extracting module and the second logistics acquiring module, until no logistics information query parameter of a next country is contained in logistics information of a transporter in a transit country, and is configured to take logistics information of the transporter in the transit country as logistics information of a final transporter.

The information combining and outputting module 28 is configured to combine and output the logistics information of the starting transporter, the logistics information of the transporters of all transit countries, the logistics information of the final transporter and the identifiers of all transporters.

Preferably, the tracking number inputted by the user is a global unique tracking number generated by the starting transporter based on a preset tracking number rule.

Alternatively, the tracking number inputted by the user is a global unique tracking number generated by the system for acquiring logistics information of transnational transport based on a preset tracking number rule and returned to the starting transporter.

Preferably, the starting information acquiring module, the first logistics acquiring module and/or the second logistics acquiring module is configured to acquire the logistics information of the transporter by the following steps:

searching a preset rule base for an information acquisition manner corresponding to the transporter based on the information of the transporter, where the information acquisition manner includes: a simulative request on a website of the transporter, a request at a public query interface of the transporter and/or a request at a cooperative query interface of the transporter;

acquiring data related to the logistics information query parameter based on the information acquisition manner through network access; and extracting all information related to logistics information from the data upon acquiring the data, where the logistics information includes a logistics event, an event time, an event location, various significant identifiers and/or information of the next transit country.

Preferably, the first information extracting module and/or the second information extracting module is configured to extract the logistics information query parameter of the transporter in the transit country, the information and the identifier of the transporter in the transit country by the following steps:

extracting a parameter used for querying logistics information of a transporter in a next transit country based on the logistics information of a previous one transporter and/or previous more transporters, where the parameter at least includes an international standard country code converted from a country identifier.

Preferably, tracking number rules of a plurality of transporters are preset in the tracking number rule base.

In a case that it is recognized based on the tracking number rule base that the tracking number conforms to tracking number rules of a plurality of transporters, information of a starting transporter specified by the user in the plurality of transporters is acquired.

In a case that the tracking number is unrecognized based on the tracking number rule base, a prompt that the tracking number is unrecognized is returned, and information of other transporter specified by the user is acquired.

Preferably, the logistics information query parameter includes one or more of a logistics tracking number, a website of the transporter, a logistics information tracking link and a postal code.

Preferably, the information combining and outputting module 28 is further configured to:

classify the combined and outputted logistics information into different types, different languages, different formats or different description of logistics information, to obtain states of different stages in a logistics process; and unify the classified states into a preset data format, and output and display the preset data format of states.

The system for acquiring logistics information of transnational transport in the present disclosure provides a one-stop full-logistics query service, and integrates full logistics information of the transnational transport into a query portal for querying, so that the user can acquire full transnational transport information from the starting transporter to the transit country to a destination country through one-time query. With the method and the system in the present disclosure, it eliminates the need for the user to query logistics of transnational transport on each respective of websites of the transporters in all countries, thereby greatly reducing logistics query time, and improving logistics query efficiency, and having significant meanings for the related practitioners in this industry.

Exemplary embodiments of the present disclosure are described above for illustration and exemplification, and the description is not intended to limit the present into a disclosed manner. Apparently, many changes and modifications may be made based on the above teaching. An objective of selecting and describing the exemplary embodiments is to explain specific principles and actual applications of the present disclosure, so that those skilled in the art can implement and utilize the various different exemplary embodiments of the present disclosure and various different selection and changes. The scope of the present disclosure is limited by the claims and equivalent manners thereof.

The invention claimed is:

1. A method for acquiring logistics information of transnational transport, characterized in that the method comprises:

step A, receiving a tracking number inputted by a user through a website query portal, and recognizing information and an identifier of a starting transporter in the tracking number based on a preset tracking number rule base;

step B, acquiring logistics information of the starting transporter based on the tracking number, the information and the identifier of the starting transporter;

step C, extracting a logistics information query parameter of a transporter in a first transit country, information and an identifier of the transporter in the first transit country from the logistics information of the starting transporter;

step D, acquiring logistics information of the transporter in the first transit country based on the logistics information query parameter of the transporter in the first transit country, the information and the identifier of the transporter in the first transit country;

step E, extracting a logistics information query parameter of a transporter in a second transit country, information and an identifier of the transporter in the second transit country from the logistics information of the transporter in the first transit country;

step F, acquiring logistics information of the transporter in the second transit country based on the logistics information query parameter of the transporter in the second transit country, the information and the identifier of the transporter in the second transit country;

step G, repeating step E and step F until no logistics information query parameter of a next country is contained in logistics information of a transporter in a transit country, and taking logistics information of the transporter in the transit country as logistics information of a final transporter;

step H, combining and outputting the logistics information of the starting transporter, the logistics information of the transporters in all the transit countries and the logistics information of the final transporter and the identifiers of all the transporters;

classifying the combined and outputted logistics information into different types, different languages, different formats or different description of the logistics information, to obtain states of different stages in a logistics process; and unifying the classified states into a preset data format, and outputting and displaying the preset data format of states;

wherein the acquiring the logistics information of the transporter in the step B, the step D or the step F comprises:

searching a preset rule base for an information acquisition manner corresponding to the transporter based on the information of the transporter, wherein the information acquisition manner comprises: a simulative request on a website of the transporter, a request at a public query interface of the transporter or a request at a cooperative query interface of the transporter;

acquiring data related to the logistics information query parameter based on the information acquisition manner through network access; and extracting all information related to logistics information from the data upon acquiring the data, wherein the logistics information comprises a logistics event, an event time, an event location, various significant identifiers or information of a next transit country.

2. The method according to claim 1, characterized in that the tracking number inputted by the user is a global unique tracking number generated by the starting transporter based on a preset tracking number rule, or the tracking number inputted by the user is a global unique tracking number generated by a system for acquiring logistics information of transnational transport based on a preset tracking number rule and returned to the starting transporter.

3. The method according to claim 2, characterized in that tracking number rules of a plurality of transporters are preset in the tracking number rule base;

in a case that it is recognized based on the tracking number rule base that the tracking number conforms to tracking number rules of a plurality of transporters, information of a starting transporter specified by the user in the plurality of transporters is acquired, and in a case that the tracking number is unrecognized based on the tracking number rule base, a prompt that the tracking number is unrecognized is returned, and information of other transporter specified by the user is acquired.

4. The method according to claim 2, characterized in that the logistics information query parameter comprises one or more of a logistics tracking number, a website of the transporter, a logistics information link and a postal code.

5. The method according to claim 1, characterized in that the extracting the logistics information query parameter of the transporter in the transit country, the information and the identifier of the transporter in the transit country in the step C and/or the step E comprises:

extracting a parameter used for querying logistics information of a transporter in a next transit country based on the logistics information of a previous one transporter and/or previous more transporters, wherein the parameter at least comprises an international standard country code converted from a country identifier.

6. The method according to claim 1, characterized in that tracking number rules of a plurality of transporters are preset in the tracking number rule base;

in a case that it is recognized based on the tracking number rule base that the tracking number conforms to tracking number rules of a plurality of transporters, information of a starting transporter specified by the user in the plurality of transporters is acquired, and in a case that the tracking number is unrecognized based on the tracking number rule base, a prompt that the tracking number is unrecognized is returned, and information of other transporter specified by the user is acquired.

7. The method according to claim 1, characterized in that the logistics information query parameter comprises one or more of a logistics tracking number, a website of the transporter, a logistics information link and a postal code.

8. A system for acquiring logistics information of transnational transport, characterized in that the system comprises:

a tracking number recognizing module configured to receive a tracking number inputted by a user through a website query portal, and recognize information and an identifier of a starting transporter in the tracking number based on a preset tracking number rule base;

a starting information acquiring module configured to acquire logistics information of the starting transporter based on the tracking number, the information and the identifier of the starting transporter;

a first information extracting module configured to extract a logistics information query parameter of a transporter in a first transit country, information and an identifier of the transporter in the first transit country from the logistics information of the starting transporter;

a first logistics acquiring module configured to acquire logistics information of the transporter in the first transit country based on the logistics information query parameter of the transporter in the first transit country, the information and the identifier of the transporter in the first transit country;

a second information extracting module configured to extract a logistics information query parameter of a transporter in a second transit country, information and an identifier of the transporter in the second transit country from the logistics information of the transporter in the first transit country;

a second logistics acquiring module configured to acquire logistics information of the transporter in the second transit country based on the logistics information query parameter of the transporter in the second transit country, the information and the identifier of the transporter in the second transit country;

a final information acquiring module configured to repeat the operations of the second information extracting module and the second logistics acquiring module until no logistics information query parameter of a next country is contained in logistics information of a transporter in a transit country, and take logistics information of the transporter in the transit country as logistics information of a final transporter;

an information combining and outputting module configured to combine and output the logistics information of the starting transporter, the logistics information of the transporters in all the transit countries and the logistics information of the final transporter and the identifiers of all the transporters;

classify the combined and outputted logistics information into different types, different languages, different formats or different description of the logistics information, to obtain states of different stages in a logistics process; and unify the classified states into a preset data format, and output and display the preset data format of states;

wherein the starting information acquiring module, the first logistics acquiring module or the second logistics acquiring module is configured to acquire the logistics information of the transporter by the following steps:

searching a preset rule base for an information acquisition manner corresponding to the transporter based on the information of the transporter, wherein the information acquisition manner comprises: a simulative request on a website of the transporter, a request at a public query interface of the transporter or a request at a cooperative query interface of the transporter;

acquiring data related to the logistics information query parameter based on the information acquisition manner through network access; and extracting all information related to logistics information from the data upon acquiring the data, wherein the logistics information comprises a logistics event, an event time, an event location, various significant identifiers or information of a next transit country.

9. The system according to claim 8, characterized in that the tracking number inputted by the user is a global unique tracking number generated by the starting transporter based on a preset tracking number rule, or the tracking number inputted by the user is a global unique tracking number generated by the system for acquiring logistics information of transnational transport based on a preset tracking number rule and returned to the starting transporter.

10. The system according to claim 8, characterized in that the first information extracting module and/or the second information extracting module is configured to extract the logistics information query parameter of the transporter in the transit country, the information and the identifier of the transporter in the transit country by the following steps:

extracting a parameter used for querying logistics information of a transporter in a next transit country based on the logistics information of a previous one transporter and/or previous more transporters, wherein the parameter at least comprises an international standard country code converted from a country identifier.

11. The system according to claim 8, characterized in that tracking number rules of a plurality of transporters are preset in the tracking number rule base;
   in a case that it is recognized based on the tracking number rule base that the tracking number conforms to tracking number rules of a plurality of transporters, information of a starting transporter specified by the user in the plurality of transporters is acquired, and
   in a case that the tracking number is unrecognized based on the tracking number rule base, a prompt that the tracking number is unrecognized is returned, and information of other transporter specified by the user is acquired.

12. The system according to claim 8, characterized in that the logistics information query parameter comprises one or more of a logistics tracking number, a website of the transporter, a logistics information tracking link and a postal code.

13. The system according to claim 9, characterized in that tracking number rules of a plurality of transporters are preset in the tracking number rule base;
   in a case that it is recognized based on the tracking number rule base that the tracking number conforms to tracking number rules of a plurality of transporters, information of a starting transporter specified by the user in the plurality of transporters is acquired, and
   in a case that the tracking number is unrecognized based on the tracking number rule base, a prompt that the tracking number is unrecognized is returned, and information of other transporter specified by the user is acquired.

14. The system according to claim 9, characterized in that the logistics information query parameter comprises one or more of a logistics tracking number, a website of the transporter, a logistics information tracking link and a postal code.

* * * * *